Oct. 21, 1930.  A. ROHRBACH  1,779,078
ENGINE COOLING SYSTEM FOR HYDROAEROPLANES
Original Filed Nov. 3, 1927
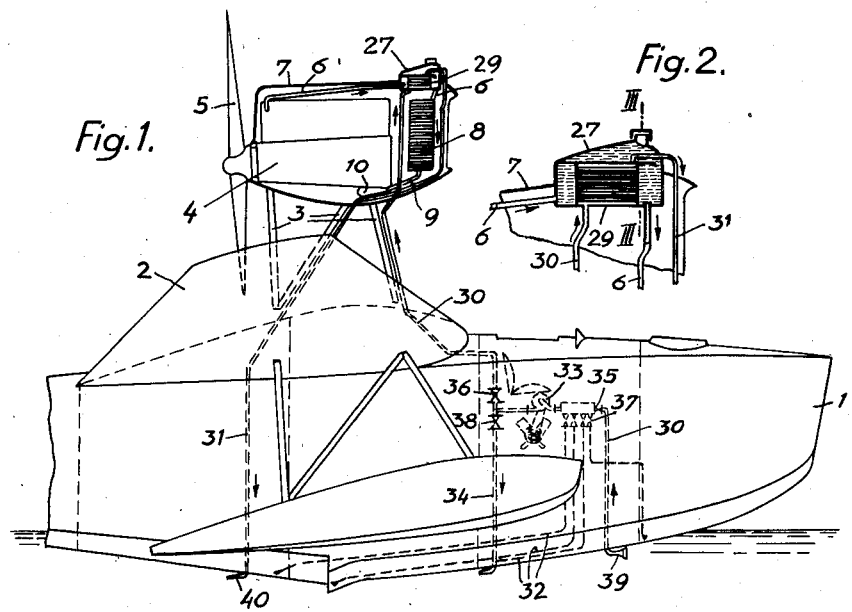
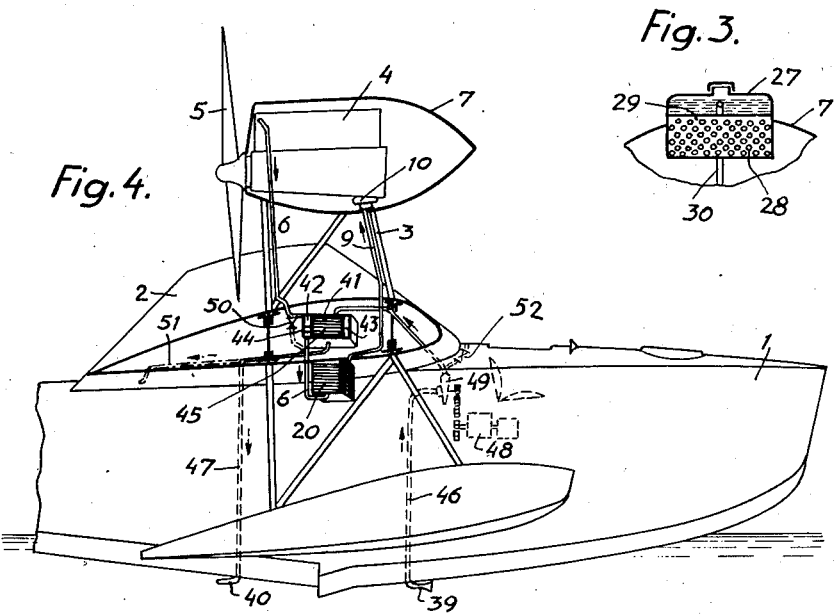
INVENTOR:
Adolf Rohrbach
by Edwards, Bower & Pool
attys Patented Oct. 21, 1930

1,779,078

UNITED STATES PATENT OFFICE

ADOLF ROHRBACH, OF BERLIN-WILMERSDORF, GERMANY

ENGINE-COOLING SYSTEM FOR HYDROAEROPLANES

Original application filed November 3, 1927, Serial No. 230,700, and in Germany March 28, 1927. Divided and this application filed December 18, 1929. Serial No. 414,997.

The invention is an improvement in, or modification of the invention claimed in and is a division of my application Ser. No. 230,700, filed November 3, 1927.

My said prior specification relates to seaplanes having water-cooled engines, with means for re-cooling the water, the invention consisting in providing, in addition to the re-cooling apparatus required while the machine is in flight, supplementary re-cooling apparatus for use while the machine is travelling afloat. The specification shows various forms of supplementary cooling apparatus arranged at or below the water level, so that it is cooled by the seawater.

According to my present invention the supplementary apparatus is arranged above the waterline, with conduits for passing seawater to and from it, a considerable part of the cooling passages being seawater passages, which can be emptied when flying, with a substantial saving of dead weight, particularly where high-powered engines are used. The water carried in the supplementary cooler, during flight, may be made to take part in the circulation, so that there is no risk of its freezing in cold weather, or at high altitudes. By placing the supplementary in an elevated position it is in general better protected than when carried low.

Two examples of apparatus according to the invention are shown in the accompanying drawings.

Fig. 1 is a side-view of a seaplane, with the engine housing in section, Fig. 2 showing the supplementary cooler in section, to a larger scale, and Fig. 3 being a section on the line III—III of Fig. 2. Fig. 4 shows a seaplane, with the engine housing and wing in section.

Referring first to Figs. 1, 2 and 3, 1 is the hull, 2 the wing, and 3 are struts supporting the engine 4 driving the propeller 5, the engine being in a housing 7. The pipe 6 feeding water to the cooler 8 is in two parts, leading respectively into, and out of, a stream-lined water container 27 above the cooler 8, this container having an equalizing effect, compensating for loss of cooling water, should such loss occur. Water flows from the cooler 8 through a pipe 9 to the pump 10. The container 27 has within it a closed box 29, with tubes 28 extending therethrough, and to this box are connected a seawater supply pipe 30 and a discharge pipe 31. Engine cooling water flows freely through the tubes in the box. The pipe 30 supplying seawater to the box 29 is connected to a bilge-water system controlled by the crew, comprising a pump 33, suction pipe 32 and delivery pipe 34, this system serving for pumping water from the compartments of the hull, separately or collectively. The bilge pump is preferably driven by an auxiliary engine. There are stop valves 35, 36 in the pipe 30, in front of and behind the pump 33, and there are also stop valves 37, 38 in the pipes 32, 34. The intake end 39 of the pipe 30, below the waterline, is flared and faces forwards, so that the travel of the boat on the water forces water into the pipe. To utilize the speed of the boat for assisting the outflow of the water the outlet 40 of the pipes 31 and 34 are in the form of suction nozzles.

During flight, engine cooling water is circulated through pipe 6, box 29, main cooler 8, pipe 9, pump 10 and engine, the cooling of the water itself being effected solely by the air to which the cooler 8 is exposed. On descent of the machine and travelling on the water, the cocks 37, 38 are closed, and the cocks 35, 36 opened, and the pump 33 is caused to propel a continuous stream of seawater through the pipe 30 and box 29, where the water cools the tubes 28, through which the engine cooling water is flowing. When the machine rises again the pipes 30 and 31, and the box 29, empty themselves of seawater. To allow of emptying them also when the machine is afloat an air cock may be provided; the cock 38 may, for example, be a combined stop cock and air cock. For pumping water from the hull the cocks 35, 36 are closed, and the cocks 37, 38 opened.

In the modification shown in Fig. 4, the main cooler 20 is suspended below the wing 2. The supplementary cooler 41 is a box having four compartments, and is inside the wing, offering no head resistance. Cooling water from the engine flows through pipe 6 to the top left-hand compartment 42 of the cooler 41, through tubes to the right-hand chamber 43, through tubes to the left-hand bottom chamber 44, and thence to the main cooler 20, from which it is pumped through pipe 9 to the engine. The large compartment 45 of the supplementary cooler is traversed by tubes and connected to seawater pipes 46, 47, fed through a pipe 46 by means of a pump 49 driven by some available auxiliary motor, say the starter or the motor 48 driving the electric light dynamo. The intake and discharge openings 39, 40 are constructed and arranged substantially as described with reference to Fig. 1. A pipe 50, with a cock, enables engine cooling water to be taken directly to the main cooler, without flowing through the supplementary cooler. A pipe 51 is indicated by broken lines, showing that the seawater used for cooling may be discharged above sea level. When the supplementary cooler is required, with the machine travelling on the water, the pump 49 is started, and propels cold seawater through the compartment 45 of the supplementary cooler 41, where it absorbs a substantial porportion of the heat of the engine cooling water. During flight the seawater pipes are empty; 52 is an air cock.

In the case of a machine having several engines, each may have a supplementary cooler, or there may be a supplementary cooler serving them all. If this cooler is placed low, and the machine has a high speed on the water it may not be necessary to use a seawater pump, the rush of the machine through the water being sufficient to drive the water through the cooler.

Another modification consists in so constructing the main cooler that it incorporates also the supplementary cooler, there being, for example, in front of the main cooler a spraying device or the like served with seawater, or seawater being when required driven through tubes which are cooled solely by air when the supplementary cooler is out of action.

With flying machines operating on rivers or fresh-water lakes, the engine water may be cooled by admixing cold water, instead of by surface cooling, the supplementary cooler being, for example, a plain vessel through which the engine water flows, the vessel having a discharge pipe, and fresh water being pumped into it. The arrangement may also be such, that the conduits for circulation of the engine cooling water can be connected directly with the fresh-water pipes, by means of suitable valves.

I claim:

1. In an engine cooling system for hydro-aeroplanes the combination of an aircooled radiator with a water-cooled radiator, the latter being adapted to be cooled by seawater, means for circulating the engine cooling fluid through said radiators and feeding sea-water to and from the said water cooled radiator.

2. In an engine cooling system of the character set forth in claim 1, wherein the water cooled radiator is disposed above the water line of the craft and provided with sea-water connections extending to the water line to feed sea-water to and from the radiator.

3. In an engine cooling system of the character set forth in claim 1, wherein the water cooled radiator is disposed above the water line of the craft and provided with sea-water connections extending to the water line to feed sea-water to and from the radiator, the latter being accommodated inside the aeroplane structure.

4. In an engine cooling system of the character set forth in claim 1, wherein the water cooled radiator is disposed above the water line of the craft and provided with sea-water connections extending to the water line to feed sea-water to and from the radiator, the latter being accommodated inside the aeroplane wing structure.

5. In an engine cooling system for hydro-aeroplanes the combination of an aircooled radiator with a water cooled radiator, the latter being accommodated inside the aeroplane structure and adapted to be cooled by sea-water, separate circulating connections for the engine cooling fluid and the circulation of the sea-water leading thereto.

6. In an engine cooling system for hydro-aeroplanes of the character set forth in claim 1, wherein the sea-water cooled radiator is a surface cooler having two separate water circulating systems.

7. In an engine cooling system of the character set forth in claim 1, wherein the water cooled radiator is disposed above the water line of the craft and provided with sea water connections extending to the water line to feed sea-water to and from the radiator and an auxiliary power driven pump unit disposed in said circulating connections for circulating the sea water.

8. In an engine cooling system of the character set forth in claim 1, wherein the water cooled radiator is disposed above the water line of the craft and provided with sea-water connections extending to the water line to feed sea-water to and from the radiator and a bilge pump with connections for connecting the pump to and from the water cooled radiator.

9. In an engine cooling system for hydro-aeroplanes of the character set forth in claim 5, wherein the sea-water cooled radiator is connected by valve controlled conduits to the bilge pump of the hydroaeroplane.

10. In an engine cooling system of the character set forth in claim 1, wherein the water cooled radiator is disposed above the water line and at a higher level than the air cooled radiator and provided with circulating pipes running to the water line to feed sea water to and from the water cooled radiator, the engine cooling fluid chambers of both radiators being connected, and the water radiator operating as an equalizing chamber for the air cooled radiator to compensate for both expansion and loss of engine cooling fluid.

11. In an engine cooling system of the character set forth in claim 1, the water cooled radiator being disposed at a higher level than the aircooled radiator, connections between the interior chamber of the aircooled radiator and the engine cooling fluid chamber of the water cooled radiator, the latter operating as an equalizing chamber for the aircooled radiator to compensate for expansion of water and loss of water.

12. In an engine cooling system of the character set forth in claim 1, wherein the water cooled radiator is disposed above the water line of the craft and provided with sea water connections extending below the water line to feed sea water to and from the radiator, the sea water piping being connected with the air cooled radiator in such manner that the latter acts also as a water washed radiator.

13. In an engine cooling system of the character set forth in claim 1, wherein the water cooled radiator is disposed above the water line of the craft and provided with sea water connections extending below the water line to feed sea water to and from the same, said sea water supply piping terminating in a sprayer provided at the air cooled radiator.

14. In an engine cooling system of the character set forth in claim 1, wherein the water cooled radiator is disposed above the water line and at a higher level than the air cooled radiator, said water cooled radiator including a reservoir connected with the interior of the air cooled radiator and containing cooling elements, the latter being connected with sea water piping extending below the water line.

15. In an engine cooling system of the character set forth in claim 1, the water cooled radiator being disposed at a higher level than the aircooled radiator in a roomy equalizing chamber, connection between the interior chamber of the aircooled radiator and said roomy chamber, a separate connection being provided between the engine cooling fluid chamber and the roomy chamber and respectively the interior of the aircooled radiator.

16. In an engine cooling system of the character set forth in claim 1, wherein the water cooled radiator is disposed above the water line of the craft and provided with sea water connections extending below the water line to feed sea water to and from the radiator, the circulating system for the engine cooling fluid being so connected with the sea water piping that it can be turned off and on at will.

17. In an engine cooling system of the character set forth in claim 1, wherein the water cooled radiator is disposed above the water line of the craft and provided with sea water connections extending below the water line to feed sea water to and from the water cooled radiator, the outlet of the sea water piping being formed as a suction nozzle discharging below the water line.

18. In an engine cooling system of the character set forth in claim 1, wherein the water cooled radiator is disposed above the water line of the craft and provided with sea water connections extending below the water line to feed sea water to and from the radiator, the outlet of the sea water piping being formed as a suction nozzle discharging below the water line and the inlet of said sea water piping being funnel shaped and disposed in the direction of flight.

19. In an engine cooling system for hydro-aeroplanes the combination of an aircooled radiator with a water cooled radiator, the latter being adapted to be cooled by sea water, means for circulating the engine cooling fluid through said radiators, pumping and leading means to feed sea water to the said water cooled radiator.

20. In an engine cooling system for hydro-aeroplanes in combination an aircooled radiator, a water cooled radiator, the latter being disposed above the water line inside the aeroplane structure and adapted to be cooled by sea water, means for circulating the engine cooling fluid through said radiators, pumping and circulating means to feed sea water to the water cooled radiator.

In testimony whereof, I have signed my name to this specification.

ADOLF ROHRBACH.